April 29, 1958 V. G. ANDERSON 2,832,593
OCULAR TOY
Filed Sept. 25, 1957

INVENTOR
VICTOR G. ANDERSON
BY
ATTORNEY

United States Patent Office 2,832,593
Patented Apr. 29, 1958

2,832,593
OCULAR TOY

Victor G. Anderson, New Rochelle, N. Y., assignor to Pictorial Productions, Inc., Tuckahoe, N. Y., a corporation of New York Application September 25, 1957, Serial No. 686,176

2 Claims. (Cl. 272—8)

The present invention relates to an ocular toy image device.

One object of the present invention is to provide a new and improved toy device of sheet-like material, which is imaged to simulate realistically or whimsically an eye or eyes, which is designed to be employed and supported over the face of a human being for a gag, which is constructed to change its visible appearance from one representation of an eye to a different representation of an eye by the mere tilting of the device through a small angle to present realistic, amusing and/or fantastic ocular actions and appearances, and which lends itself to manufacture on a mass production basis.

As a feature of the present invention described, the toy device is a changeable or multiple picture device comprising a lenticular viewing screen having on its front face a series of very fine contiguous parallel convolutions constituting segments of optical cylinders defining lens elements, and a print sheet disposed at the back of said screen in face to face contact therewith, as to be exposed or displayed therethrough and containing at least two alternate series of spaced image lines, each series of image lines constituting a dissection or break-up of a master picture representing an eye with surrounding associated features such as the eyelid and the eyelashes. One of the master pictures represents an eye in one position, condition, aspect or characterization and the other master picture represents an eye in a different position, condition, aspect or characterization. The two series of image lines are so optically related with respect to the lens elements of the viewing screen, as to be alternately visible upon positional change of the screen with respect to the line of vision. The toy device, thereby, gives the vivid impression of an eye changing in position, condition, aspect or characterization. This toy device may be realistically designed to give a true impression of a live eye, to be used on the human face as a gag.

As an additional feature of the present invention, the toy device is designed to be mounted on the face of an individual by means simulating an eye glass mount. In the specific embodiment of the invention, this simulated eye glass mount is in the form of a spectacle frame, whereby the frame with attached device simulating eyes may be worn as a pair of spectacles.

As a further feature of the invention, the toy device when designed to be used on a human face as a gag, has a hole in position to permit visible observation therethrough when worn. This hole is desirably in the center of the iris image where the pupil image would be located so as to render it almost unobtrusive except to simulate the pupil of the eye.

Other objects, features and advantages of the invention are apparent from the following particular description and from the accompanying drawings, in which—

Figure 1:
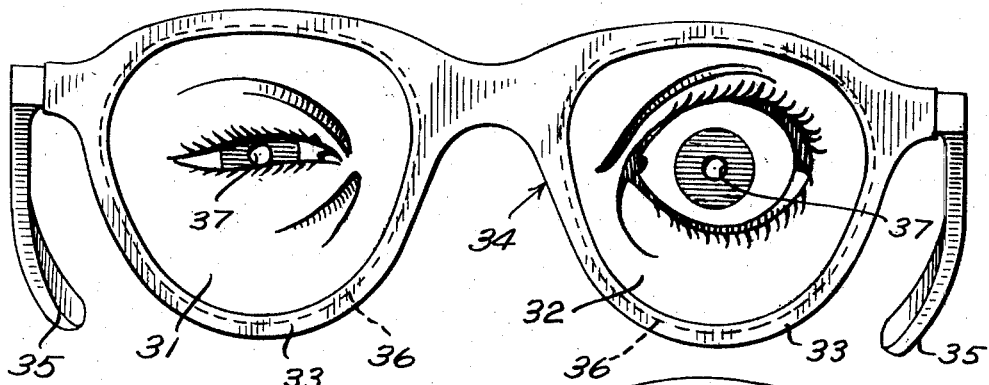
Fig. 1 is a front view of the device of the present invention shown associated with a pair of spectacles.
Figure 2:
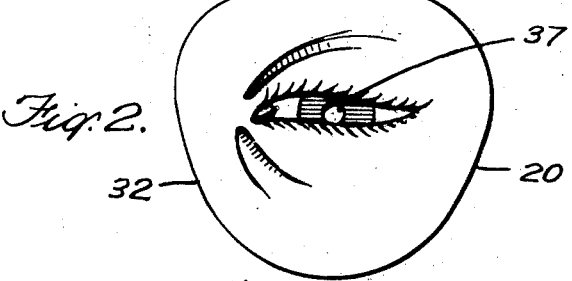
Fig. 2 shows one of the eye pieces of Fig. 1, representing one eye and shown out of the frame of the spectacles and tilted to bring into view the eye in closed position.
Figures 3, 4:
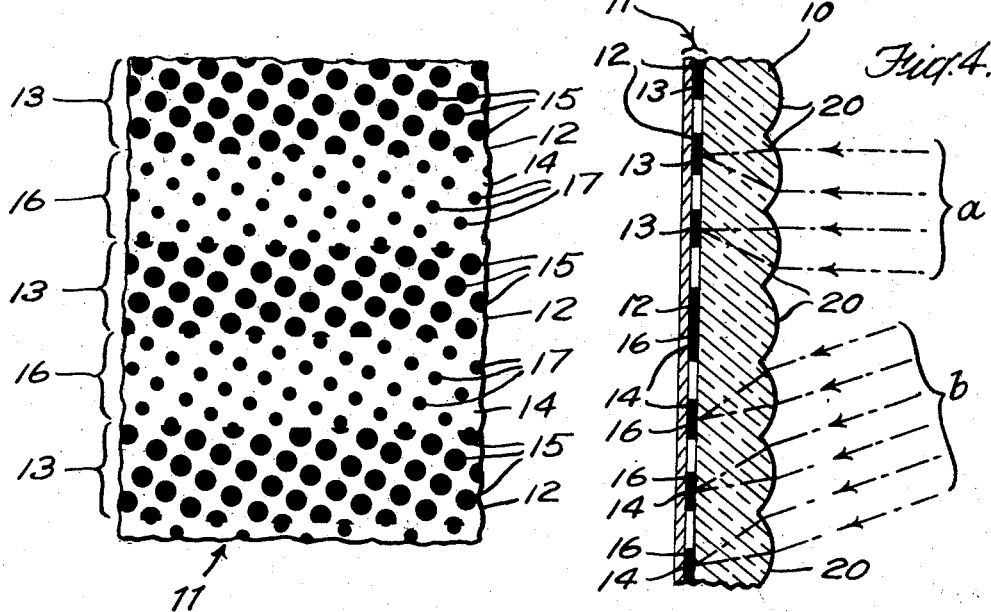
Fig. 3 is a front face view on an enlarged scale of a part of the print sheet forming part of the eye piece and shown without the lenticular screen.
Fig. 4 is a section on an enlarged scale of the eye piece showing the optical principles on which the device operates.

Referring to the drawings, the toy device of the present invention comprises in general a transparent lenticular viewing screen 10 and a backing image or picture sheet 11 constituting a print sheet disposed behind said screen as to be exposed therethrough and affixed thereto in any suitable manner, as for example, by transparent or colorless adhesive. The front face of this sheet 11 has printed thereon two representations 12 and 14 of eyes, in different positions, conditions, aspects or characterizations. In the specific embodiment shown, this difference in the appearances of the eyes is attained by making one representation that of an open eye, and the other representation that of the same eye but closed or partially closed. One of these representations 12 consists of spaced linear rows 13 of image components 15, which may be either a series of small dots, if the printed sheet 11 is a half-tone photo-engraving, as shown in Fig. 3, or fine parallel lines where the print sheet is a simple photo-engraving or impression. The other representation 14 also consists of spaced linear rows 16 of image components 17, which may be either half-tone dots or lines, as in the case of the image components 15. These linear rows 16 of image components 17 are alternately disposed with respect to the linear rows 13 of image components 15. In Fig. 4, as a matter of convenience in illustrating the optical principles on which the toy device of the present invention operates, the rows 13 and 16 of image components of the representations 12 and 14 are indicated as black lines.

The two representations 12 and 14 may be made in the manner well-known in the photo-engraving and changeable picture art from an actual eye by photographing said eye in open and closed positions or from master pictures of an eye. The master picture from which the representation 12 would be made, would be the portrayal of the open eye and the rows 13 of image components 15 of this representation are so close together on the print sheet, that when viewed, they optically blend to impart a coherent impression of an open eye. The master picture from which the representation 14 would be made, would be the portrayal of the eye closed or partly closed and the rows 16 of image components 17 of this representation alternating with the component rows 13, will when viewed, blend optically to impart a coherent impression of a closed or partially closed eye.

The lenticular screen 10 is made of transparent material such as cellulose acetate and has formed on the front face thereof a series of continuous segments of cylinders defining lens elements 20 extending parallel to the lineations 13 and 16 on the print sheet 11. The screen 10 and the print sheet 11 have their lenticulations and lineations multiply related according to the number of representations on said print sheet. For example, if the viewing screen 10 has 64 lens elements 20 per inch and if the print sheet 11 has only two representations printed thereon, as in the specific embodiment shown, this sheet would have 128 image component lines 13 and 16 per inch and each pair of adjoining image lines 13 and 16 would be disposed behind a corresponding lens element 20. With this arrangement, the screen 10 and the print sheet 11 will be in optical registry or coincidence, to cause the image component lines 13 of the representation 12 to be optically composed and to come into view as a coherent and comprehensive image of the eye in open position and the image component lines 16 of the other representation 14 to be blanked out of view when the toy device is in one angular position with respect to the line of vision of the observer, and to cause the image component lines 16 of the other representation to be optically composed and to come into view as a coherent and comprehensive image of the eye in closed or partially closed position, when the angular position of the toy device is changed with respect to the line of vision. The image rays by which the different representations 12 and 14 are brought separately and independently into view through the lenticular viewing screen 10 by reason of a change in the angle of observation are indicated by dot and dash lines a and b in Fig. 5.

The representations 12 and 14 of the eyes in open and closed position include not only the eye proper but also all of the surrounding features, such as the eyelid, eyelashes and the flesh areas surrounding the eyeball, and the two representations are in shaded colors corresponding to those of the actual eye and of the surrounding regions for substantial realism.

In the specific embodiment shown, the toy devices constructed as described are shaped to form eye pieces 31 and 32 to be used in connection with a simulated ophthalmic mounting. The two eye pieces 31 and 32 would be the same, except that they would be reversed to represent the left eye and the right eye and would be peripherally shaped to fit in the rims 33 of a spectacle frame 34, which may be of plastic and which has hinged bows or ear pieces 35 as in the usual eye spectacles, to permit one to wear the eye pieces conveniently by wearing the spectacles. The rims 33 have respective grooves 36 on the inside as in the ordinary spectacles, to receive and retain therein the corresponding eye pieces 31 and 32, and the eye pieces are sufficiently elastic to permit them to be snapped into these grooves by application of pressure. The frame rims 33 thereby conceal the edges of the eye pieces 31 and 32, thereby rendering said edges unobtrusive and enhancing the realism of the ocular representations thereof.

The eye pieces 31 and 32 have respective holes 37 in the center of its iris image of the eye, these permitting the wearer of the spectacles to see therethrough. Since the regions behind the holes 37 are shadowed, these will appear dark behind the holes to a person observing the wearer of the spectacles, and to such a person, these holes will therefore, appear to constitute the pupils of the eyes. This enhances the realism of the ocular representations to such a person, while permitting the wearer to see through these holes.

The representation 14 of the closed eye is desirably not that of an eye entirely closed, so that the holes 37 showing through the eye pieces 31 and 32 will still give the impression of being the pupils of the eyes, when the eye pieces are tilted into position to bring into view this representation.

The two eye pieces 31 and 32 may be arranged in optical phase to create the impression of both eyes opening at the same time or closing at the same time, as the wearer tilts his head to change the line of vision of the person observing the wearer and to effect thereby changeovers in the images brought into view. However, as indicated in the drawings, the two eye pieces 31 and 32 in the specific embodiment are out of optical phase to create the impression of one eye opening and one eye simultaneously closing, as the angle of vision is changed.

The representations of the eyes in the eye pieces 31 and 32 may be exaggerated either in size or expression, to give a grotesque, whimsical, amusing appearance to the observer, and the wearer by tilting and/or oscillating his head in certain ways may produce startling diverting ocular effects.

While the invention has been described with particular reference to a specific embodiment, it is to be understood that it is not to be limited thereto, but is to be construed broadly and restricted solely by the scope of the appended claims.

What is claimed is:

1. An ocular toy of a form simulating a spectacle lens comprising a sheet of transparent material constituting a viewing screen having one face lenticular with a series of parallel longitudinal lens elements formed therein, a print having formed thereon spaced parallel linear components of two different images which are representations of an eye with the lids in different positions, the linear components of one image alternating with those of the other image, the print having an observation hole therein and being attached to the face of the screen opposite the lenticular face with the linear image components optically related to the lens elements of the screen to cause the components of one image to be optically composed into a composite image with the components of the other image blanked out in one position of the toy with respect to the angle of the line of vision of an observer and to cause the components of the other image to be optically composed into a composite image with the components of the one image blanked out in another position of the toy with respect to the angle of the line of vision of an observer, and mounting means in the form of a simulated eye glass mount to mount the toy upon a face of an individual with the lenticular face of the screen outward and the said hole in front of the iris of the eye of the wearer.

2. An ocular toy as defined in claim 1 in which the mounting means is a spectacle frame having a composite screen and print lens simulating device as defined in said claim in each lens holder rim of the frame.

References Cited in the file of this patent

UNITED STATES PATENTS

| | | |
|---|---|---|
| 560,418 | Lorenz | Mar. 19, 1906 |
| 1,475,430 | Curwen | Nov. 27, 1923 |
| 1,526,211 | Hirschman | Feb. 10, 1925 |
| 2,586,504 | Benge | Feb. 19, 1952 |